United States Patent [19]

Evans

[11] 4,201,271
[45] May 6, 1980

[54] QUILL DRIVE WITH VARIABLE FEED

[76] Inventor: Larry Evans, 5222 Botsford, Sterling Heights, Mich. 48077

[21] Appl. No.: 923,459

[22] Filed: Jul. 10, 1978

[51] Int. Cl.² .................... B23Q 5/027; B23Q 5/033
[52] U.S. Cl. .................................... 173/146; 408/137
[58] Field of Search .............. 173/145, 146, 19; 408/129, 137

[56] References Cited

U.S. PATENT DOCUMENTS

| | | | |
|---|---|---|---|
| 2,768,539 | 10/1956 | Wollenhaupt | 77/32.3 |
| 2,905,440 | 9/1959 | Gerentes | 255/47 |
| 3,160,033 | 12/1964 | Moyer | 77/34.7 |
| 3,640,147 | 2/1972 | Fantoni | 74/424.8 |
| 3,711,212 | 1/1973 | Kuck | 408/3 |
| 3,740,161 | 6/1973 | Milewski | 408/158 |
| 3,859,001 | 1/1975 | Hoddinott et al. | 408/3 |
| 3,885,635 | 5/1975 | Menzel | 173/146 |
| 3,955,629 | 5/1976 | Turner | 173/19 |

Primary Examiner—Ronald Feldbaum
Attorney, Agent, or Firm—Basile and Weintraub

[57] ABSTRACT

A quill drive comprising a housing adapted for mounting on machine tools. A quill is slidably mounted in a longitudinal bore in the housing, and is longitudinally positioned by a ball screw. The ball screw is driven for longitudinal positioning of the quill by a variable speed, reversible motor. The quill rotatably supports a spindle for driving various cutting tools. The spindle is advanced longitudinally by the quill and is rotatably driven by a second motor. The quill drive can be used singly or in a multiple arrangment on transfer machines or other automatic equipment. The unique design has fewer parts resulting in a simple reliable, relatively inexpensive device which is compact and easy to use. A relatively simple modification of the gear box converts the quill drive into a drive for tapping threaded holes.

8 Claims, 9 Drawing Figures

QUILL DRIVE WITH VARIABLE FEED

BACKGROUND OF THE INVENTION

I. Field of the Invention

The present invention relates generally to the field of quill drives for machine tools and, in particular, to quill drives having an infinitely variable feed.

II. Description of the Prior Art and Prior Art Statement

Constituted in the prior art are the following U.S. Pat. Nos. 3,955,629, 3,160,033, 3,711,212, 2,905,440, 2,768,539, 3,640,147, 3,740,161, 3,561,544, 3,859,001, and 3,885,635. All of the above patents do not anticipate the present invention in that they use a multiplicity of motors for varying feed rate, or use planetary gears and clutches to vary feed rate, or use an offset feed mechanism, or they drive a ball nut arrangement to accomplish the feed function.

In the opinion of the Applicant U.S. Pat. Nos. 3,859,001 and 3,885,635 constitute the most relevant prior art to the present invention in that a ball nut disposed in the longitudinal center of the unit is driven to achieve the feed operation. The mechanical complexity of this arrangement renders its design more expensive. U.S. Pat. No. 3,885,635 drives a ball nut in the longitudinal center of the unit as well to achieve the feed drive, and in addition, U.S. Pat. No. 3,885,635 uses two feed drive motors operating at different speeds with clutches to vary the feed rate. Clearly, the two patents cited as the closest art are far more complex than the present invention and more costly in their construction.

SUMMARY OF THE INVENTION

The present invention relates to a quill drive having a housing adapted for mounting on machine tools of various type. The quill housing has a longitudinal bore which slidingly supports a quill which, in turn, is longitudinally advanced by means of a ball nut and screw. The quill is of hollow construction and it rotatably supports, by means of bearings, at its interior a spindle shaft. The spindle shaft is rotatably driven by a spindle drive means and it is advanced longitudinally with the quill.

A gear box, fixedly attached at one end to the quill housing, provides a mounting for a quill drive motor and a spindle drive motor. A gear box cover is attached to the other end of the gear box. A train of gears provides a means whereby the quill drive motor drives the ball screw. The gear box housing and gear box cover provide support for the bearings which support the gears therebetween.

The ball screw is rotatably supported by bearings in the quill housing and the gear box cover. An input shaft which drives the spindle shaft is rotatably supported by a bearings in the ball screw and the gear box cover. A shiv fixedly attached to the spindle drive motor drives a timing belt which in turn drives a shiv fixedly attached to the input shaft. A simple modification of the gear box wherein the ball screw and spindle are geared to a common input converts the quill drive to a tapping drive for producing threaded holes.

It is therefore, an object of this invention to provide a quill with infinitely variable and reversable feed which is simple in construction, reliable in operation, and inexpensive to produce in comparison to others.

It is further object of this invention to provide a quill drive which is easily convertable to a tapping drive with a minor rearrangement of the parts.

Another object of the present invention is to provide an adjustable stop for the maximum outward position of the quill that is concentric with the quill is easily adjustable and is accurate and repeatable. A meter relay is provided to stop the advance of the machine when the stop is engaged.

Other objects, advantages and applications of the present invention will become apparent to those skilled in the art of quill drives when the accompanying description of one example of the best mode for practicing the invention is read in conjunction with the accompanying drawing.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
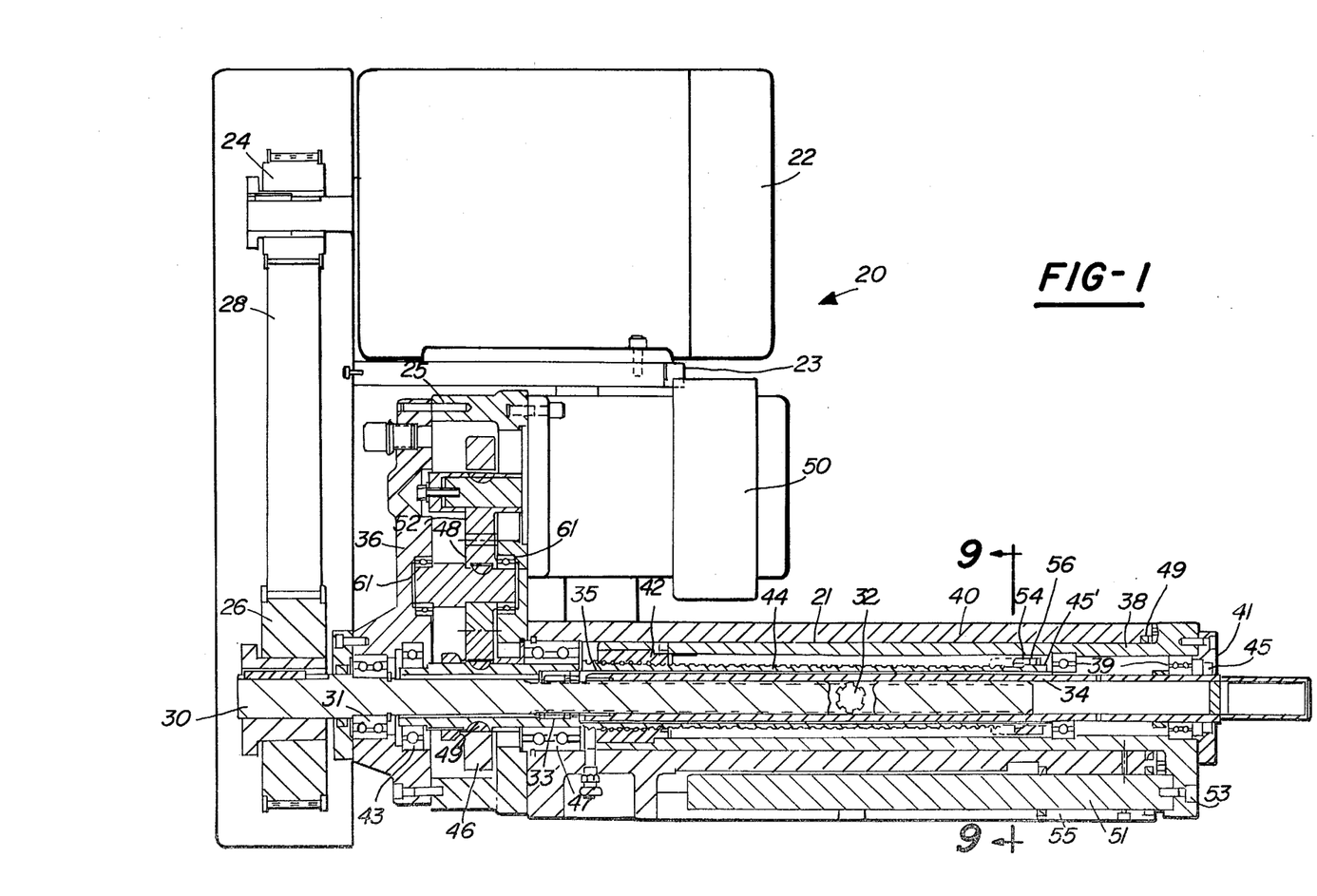
FIG. 1 is a cross-sectional view of one example of a quill drive constructed in accordance with the principles of the present invention.

Referring now to the drawings and, in particular to FIG. 1 wherein there is illustrated one example of the present invention in the form of quill drive 20. The drive 20 comprises a quill housing 40 having a longitudinal bore 21 which slidingly supports a quill 38. One end of a gear box housing 25 is fexedly attached to the quill housing 40. A quill drive motor 50 is attached to the gear box housing 25. A spindle drive motor 22 is supported by a bracket 23 which, in turn, is carried by the housing 40. A gear box cover 36 is fixedly attached to the other end of the gear box housing 25.

A shiv 24 is fixedly attached to the shaft of the spindle drive motor 22 such that the shiv 24 transmits power to a belt 28 which in turn drives a second shiv 26 that is fixedly attached to and rotatably drives an input shaft 30. The input shaft 30 is rotatably supported by a bearing 31 in gear box cover 36 and a bearing 33 in a ball screw 44. Input shaft 30 has along its inner end a male spline 32 which slidingly and drivingly engages a female spline 35 disposed in the center of a spindle shaft 34.

A torque reaction bar 51 is attached to the lower end of quill 38 at its spindle end by means of a threaded fastener 53. A bore 55 in quill housing 40 slidingly engages reaction bar 51 preventing rotation of quill 38 thereby.

Spindle shaft 34 is rotatably mounted within and longitudinally carried by a pair of bearings 39 in quill 38. A seal retainer 41 supports a shaft seal 45 which rotatingly seals spindle 34 against the seepage of lubricant thereby. Quill 38 is slidably supported by a longitudinal bore 21 in quill housing 40. A seal 49 slidingly seals quill 38 preventing the seepage of lubricant thereby. Quill 38 is tubular in shape and at its innermost end it fixedly supports a ball nut 42. Ball nut 42 threadingly engages ball screw 44 which is rotatably supported by a bearing 43 in housing 36 and bearing 47 in housing 40. A gear 46 is drivingly attached by a key 49 to ball screw 44. Ball screw 44 is driven by an idler gear 48 and a pinion 52. Idler gear 48 is rotatably supported by a pair of bearings 61 in gear case 25 and cover 36. Pinion 52 is fixedly attached to the shaft of a Servo motor 50. Servo motor 50 is a variable speed two direction motor, which provides means to move quill 38 longitudinally in either direction at any desired speed.

Figure 9:
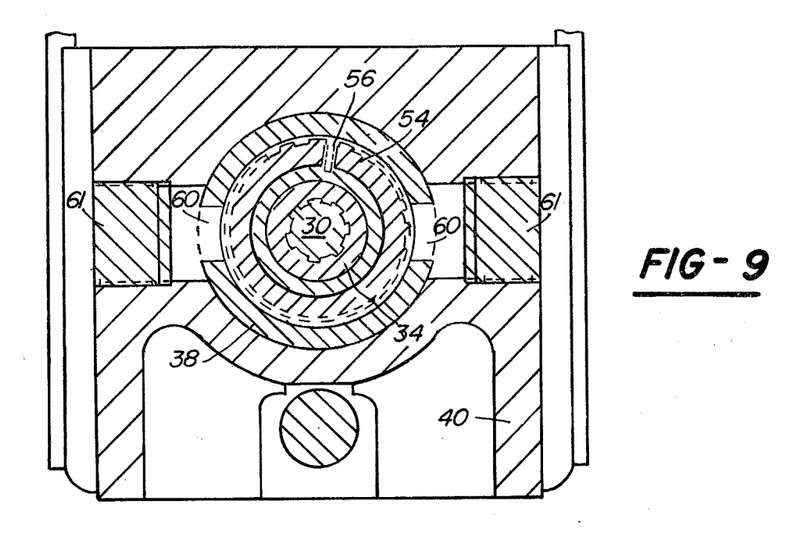
FIG. 9 is a cross-sectional view of FIG. 1 taken along plane 9—9 of FIG. 1

Ball screw 44 has its innermost end threaded along the outside diameter for a predetermined distance. A stop ring 54 threadingly engages a threaded portion 45 of ball screw 44. When quill 38 is fully extended, stop ring 54 contacts the inner end of ball nut 42, preventing further motion. The position at which quill 38 is stopped is varied by rotating stop ring 54 moving it axially along the inner end of ball screw 44. A set screw 56 locks stop ring 54 in place. An access hole 60 allows adjustment of stop ring 54 (FIG. 9). Removing a plug 61 allows stop ring 54 to be rotated by means of a screw driver or the like thereby moving stop ring 54 axially along ball screw 44 by means of thread 45. When the desired position of stop ring 54 is established set screw 56 is tightened and plug 61 is reinstalled.

The fully extended position of the quill 38 can be controlled by means of limit switches which are cam operated and adjustable in a conventional manner. However this method has inaccuracies caused by deflection of the parts, inertia of the moving parts, dirt or chips on the cam or rollers, wear, etc. The use of stop ring 54 is positive, it is concentric to the quill, and highly repeatable with great accuracy. A meter relay 136 (FIG. 7) is provided as part of the electrical circuit to stop the motion of the quill when the stop ring 54 comes against ball nut 42.

The adjustable meter relay 137 (FIG. 7) is included in the electrical circuit to provide a load sensitive machining operation allowing a maximum rate of feed for a maximum amount of metal removal consistent with the capacity of the machine or the desired machine finish.

Figure 7:
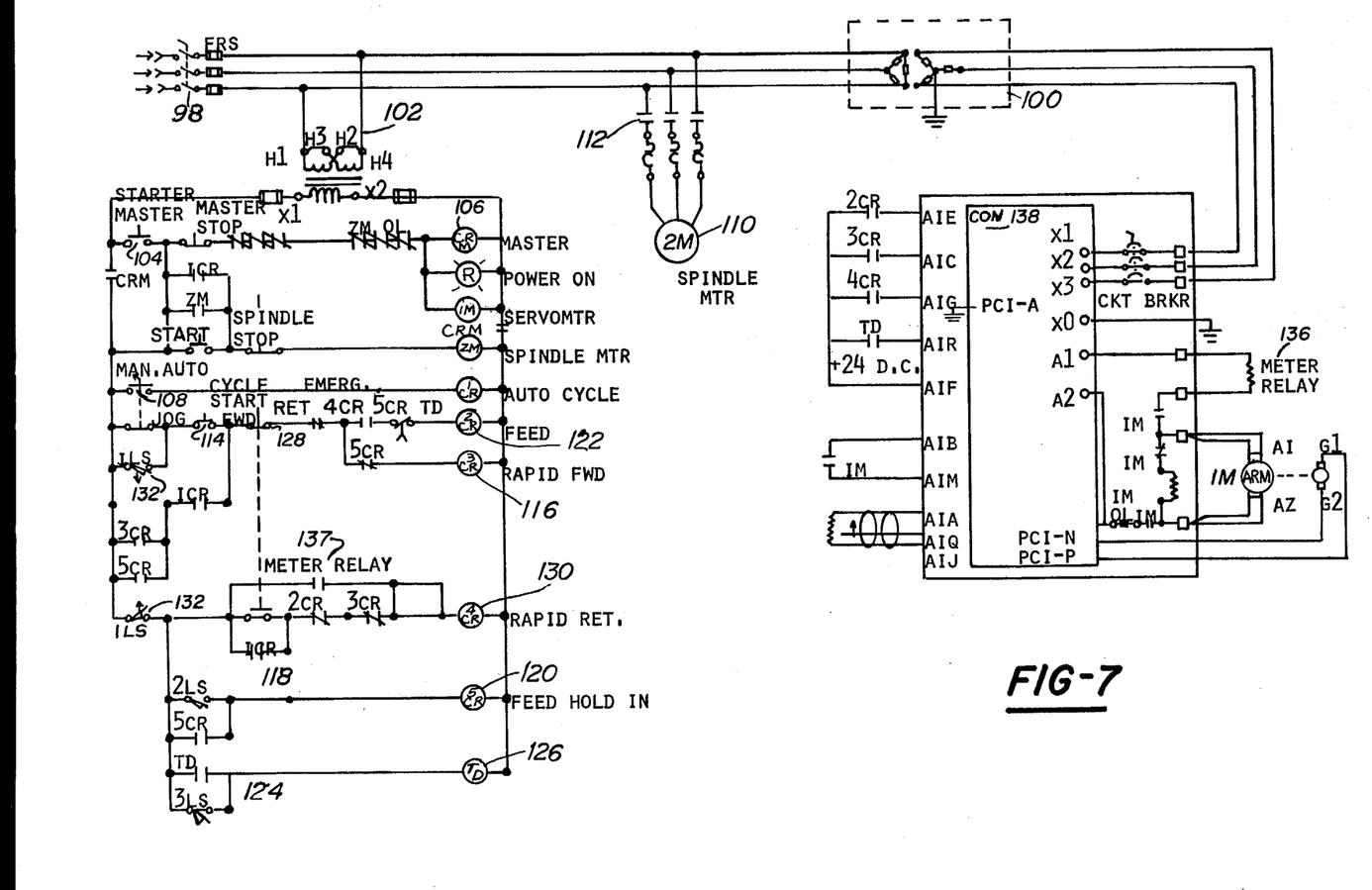
FIG. 7 shows a typical electrical circuit for the operation of the quill drive.
Figure 8:
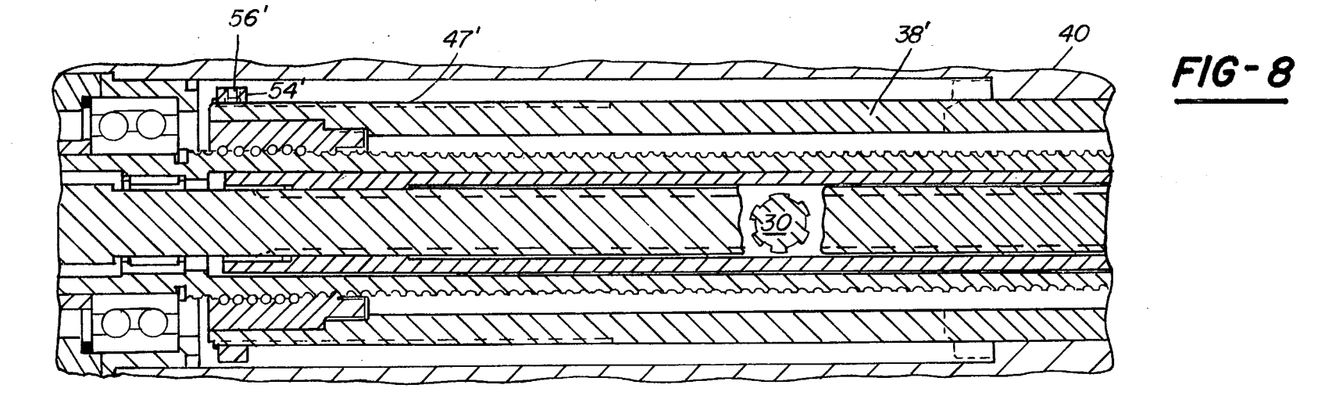
FIG. 8 illustrates the quill drive of FIG. 1 with another embodiment of a stop for controlling the fully extended position of the quill.

Referring now to FIG. 8 wherein there is illustrated another means for adjusting the maximum extension of quill 38. Quill 38 has its innermost end threaded along its outside diameter for a distance. A stop ring 54' threadingly engages the threaded portion 47' of quill 38'. When quill 38' is extended to the adjusted amount, stop ring 54' contacts the end wall of housing 40, preventing further motion. The position at which quill 38' is stopped is varied by rotating stop ring 54' moving it axially along the threaded portion of quill 38'. A set screw 56' locks stop ring 54' in place. Access hole 60 allows adjustment of the stop ring 54' using a screw driver or the like as in the embodiment illustrated in FIG. 9. The meter relay 136 (FIG. 7) is provided as part of the electrical circuit to stop the rotation of the ball screw and the quill motion when stop ring 54' contacts the housing.

Figure 2:
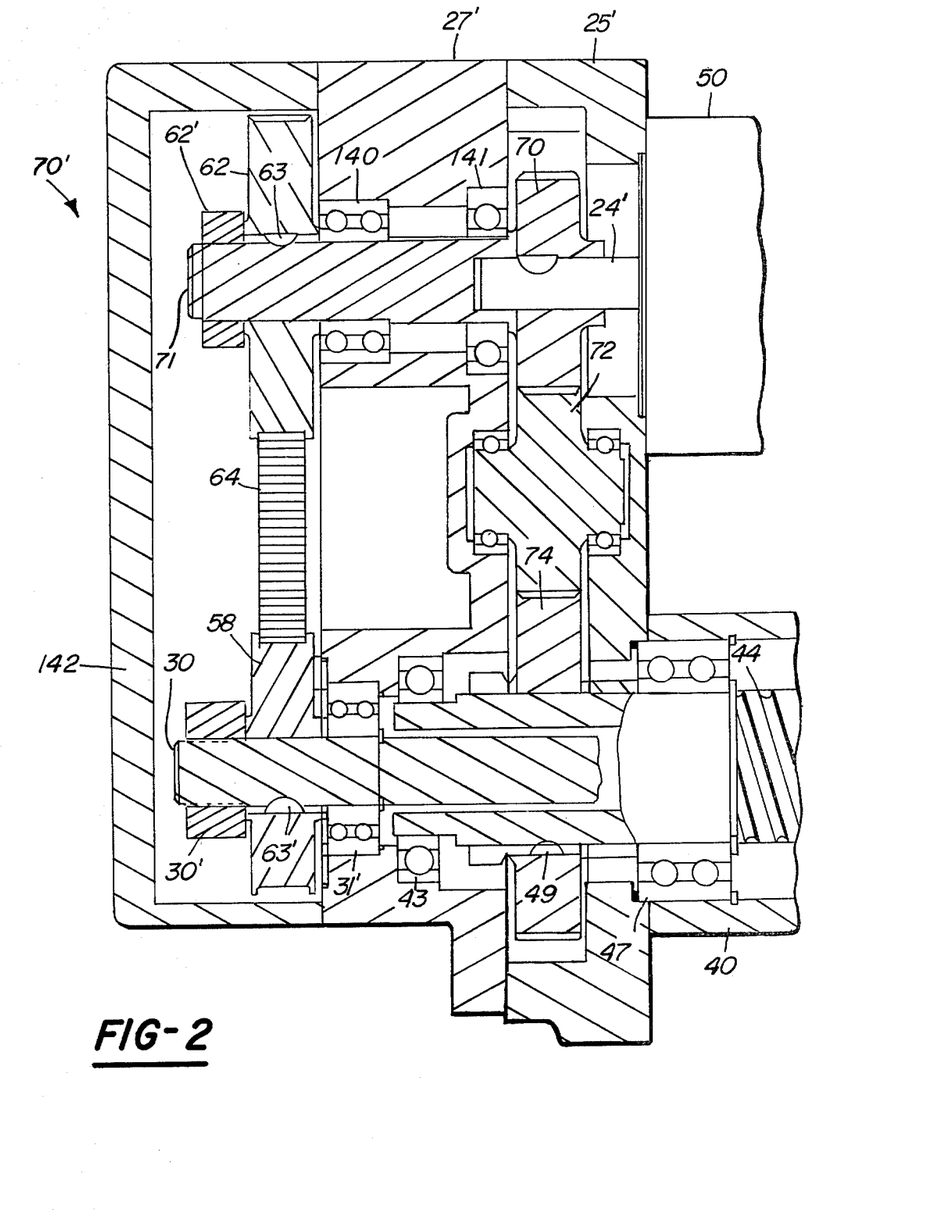
FIG. 2 is a fragmentary enlarged, sectioned view of a drive train arranged for tapping using timing belts.

Referring now to FIG. 2 wherein gear box 70' has been adapted for tapping. Housing 25' is fixedly attached at one end to quill housing 40 by suitable threaded fasteners (not shown). A reversable drive motor 50' having a shaft 24 is fastened to housing 25'. Bearing housing 27' abuts the other end of housing 25'. A gear train comprising pinion gear 70, idler gear 72 and driven gear 74 transmits the rotation of shaft 24 to ball screw 44. Ball screw 44 is rotationally supported by bearings 43 and 47. A female keyway on gear 70 is driven by a mating male key on shaft 24. Gear 70 is rotationally supported by bearings 140 and 141 in bearing housing 27' and has at its end a threaded portion for threadingly engaging a nut 62'. The outer races of bearings 140 and 141 abut shoulders in bearing housing 27'. A shiv 62 is rotationally supported by gear shaft 70. Tightening bearing nut 62' axially aligns gear 70 and shiv 62 by means of bearings 140 and 141 abutting their shoulders in bearing housing 27' at their outer races. A key 63 rotationally affixes gears 70 to shiv 62. Shiv 62 drives timing belt 64, and timing belt 64 drives a shiv 58 which is rotationally attached to input shaft 30 and drives input shaft 30 by means of a key 63'. Input shaft 30 is rotationally supported by bearing 31' in bearing housing 27'. Bearing nut 30' threadingly engages a thread on the end of shaft 30 to hold shiv 58 in its axial position.

The gear ratio between gear 70 and gear 74 is conveniently selected so that only a variation in the diameter of shiv 58 and shiv 62 is required to change the amount of advance quill 38 makes per revolution of spindle shaft 34. To make, for example, on a piece to be machined, a thread having twelve threads per inch, the shivs 58 and 62 are selected to give an advance of quill 38 (FIG. 1) in the amount of 1/12 inch per revolution of input shaft 30. A cover 142 is attached to the end of the bearing housing 27' using threaded fasteners (not shown). Cover 142 conceals the belt 64 and shivs 58 and 62.

Figure 3:
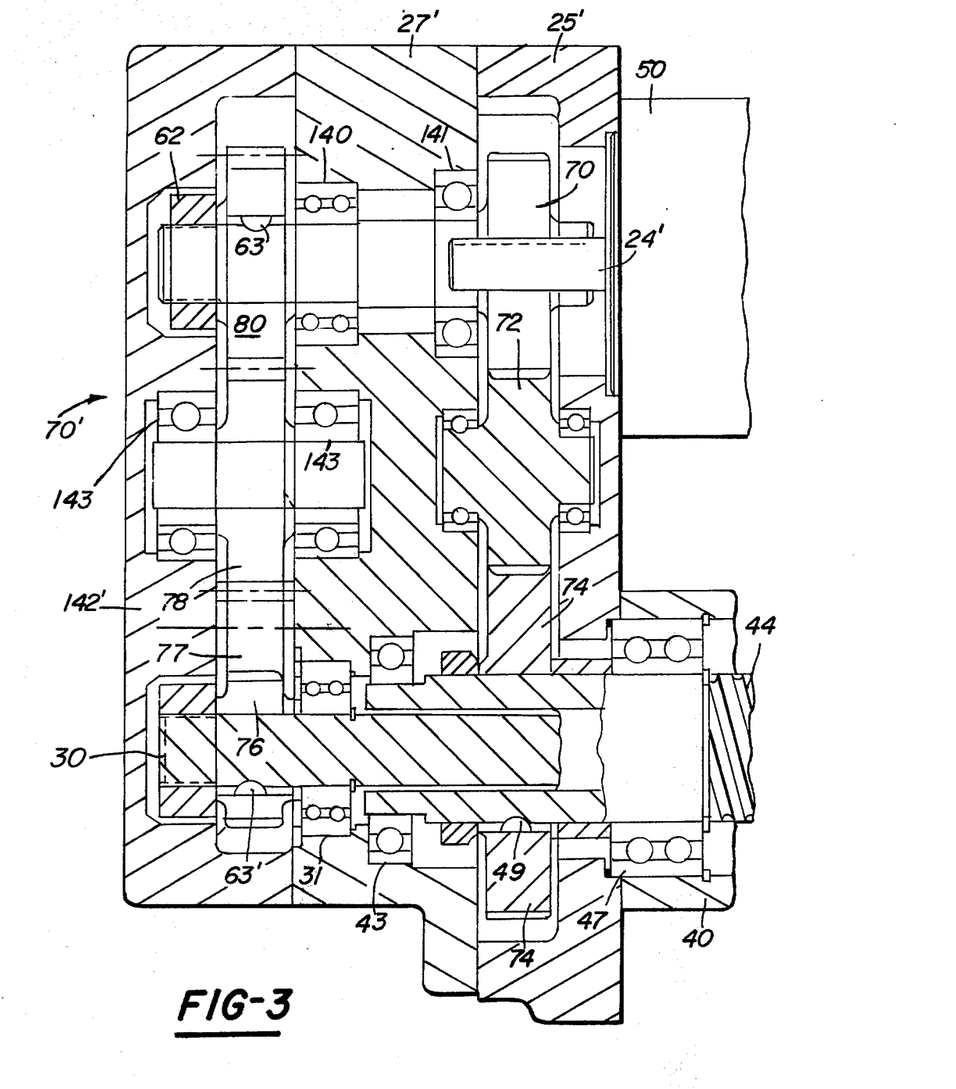
FIG. 3 is a fragmentary enlarged, sectioned view of a drive train arranged for tapping using a gear train.
Figure 4:
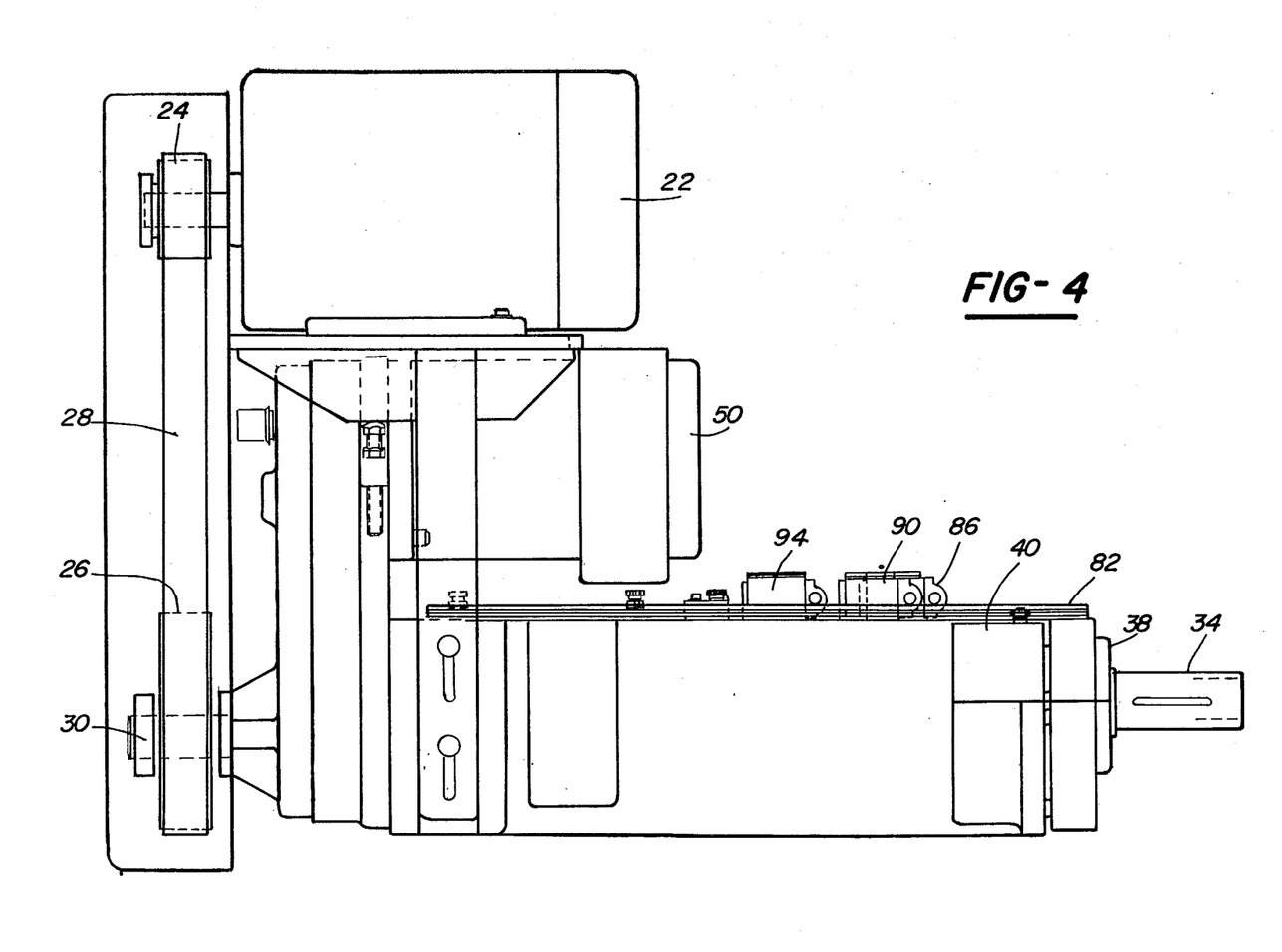
FIG. 4 is a side elevational view of the quill drive illustrated in FIG. 1.
Figure 5:
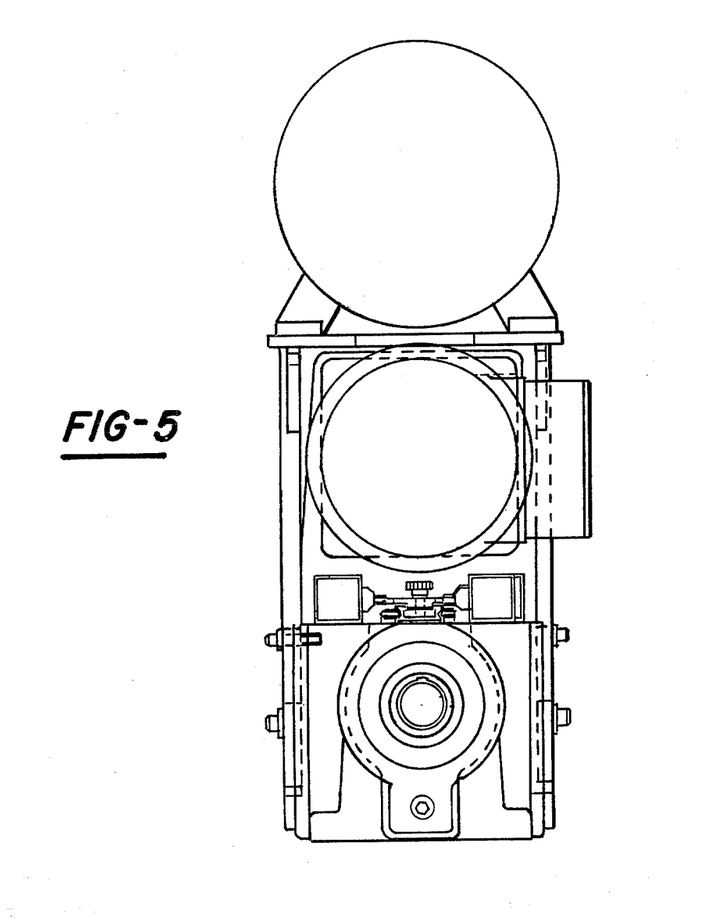
FIG. 5 is a front view of the quill drive of FIG. 4.

Referring now to FIG. 3 wherein gear box 70' has been adapted for heavy duty tapping. Shivs 58 and 62 and timing belt 64 have been replaced by a meshing set of gears 76, 77, 78, and 80 which perform the same function as the parts replaced. Gears 76 and 80 directly replace shivs 58 and 62 on their respective shafts 30 and 70. Gears 77 and 78 are each rotatably supported by a pair of bearings 143 mounted in bearing housing 27' and cover 142' respectively. Gear 77 is only partly shown in FIG. 3 and its supporting bearings are not shown because the center of gear 77 is not in the plane of the section.

Figure 6:
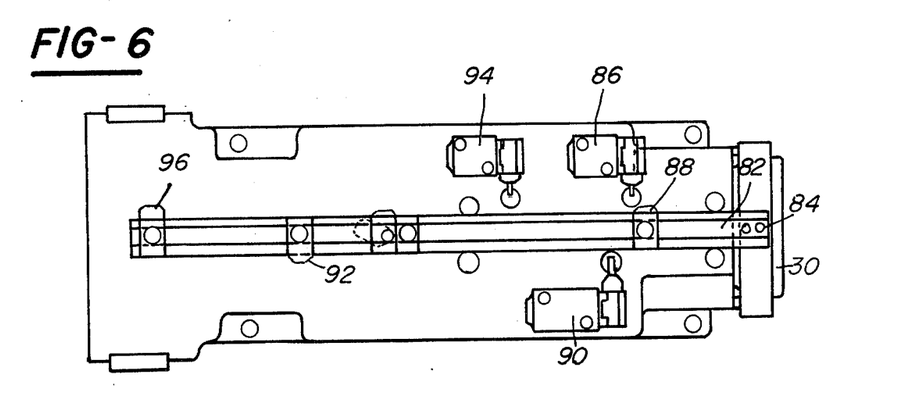
FIG. 6 is a top view of FIG. 4 showing a standard limit switch assembly.

Referring now to FIG. 6 wherein a standard limit switch assembly is illustrated. A cam bar 82 is attached to quill 38 by screws 84. Cam bar 82 moves longitudinally with quill 38. In the position shown, quill 38 is retracted and a limit switch 86 is actuated by a cam, 88 holding the quill in the retracted position. To cycle the machine, a cycle start button (not shown) is pressed and the quill moves forward in the rapid advance mode until a limit switch 90 is actuated by a cam 92 which places the quill into the feed mode. The quill advances in its feed mode until a cam 96 actuates limit a switch 94 which activates a dwell followed by an automatic return motion returning the quill to its original position where limit switch 86 is actuated by cam 88 and the machine is ready for another cycle.

Referring now to FIG. 7 wherein a typical wiring diagram for the quill drive is shown. To place the machine in operation the main switch 98 is first closed.

Current then flows to the power transformer 100 and the control transformer 102. When the master start button 104 is pressed, the relay 106 is energized and holds itself closed. If the selector switch 108 is in the "manual" position to the left, nothing happens. If selector switch is in the "auto" position the spindle motor 110 starts by closing the relays 112. Use of the "manual" position allows the unit to be cycled without the spindle running preventing tool damage. When the unit is in the "manual" position, the quill position can be jogged by pressing the cycle start button 114 which energizes the rapid forward relay 116. The unit will move "rapid forward" as long as button 114 is pressed until the feed the switch 118 is closed by its cam. When feed switch 118 is closed a relay 120 is energized and relay 116 is deenergized. Relay 120 energizes a relay 122 and holds it in until the limit switch 124 is closed energizing the dwell timer 126 which holds closed for a preset time then it opens. When 126 opens, relay 122 is opened stopping the feed and pressing button 114 after this has no effect. Pressing the button 128 returns the unit by energizing a relay 130. Returning the quill to actuate limit switch 132 which allows the quill to again be jogged forward by pressing button 114.

With selector switch 108 in its "auto" position, pressing button 114 energizes relay 116 which holds itself closed and which moves the quill forward in rapid feed until switch 118 is closed energizing relay 120. This holds the unit in "feed" until limit switch 124 is closed energizing time delay 126. This stops the feed and holds the quill in position for a preset time after which 126 opens which energizes relay 130 for rapid return. The quills longitudinal motion comes to a stop when limit switch 132 is reached and closed by its cam. Meter relay 136 protects the Servo motor from overload in the event that a tool becomes jammed or too rapid a feed is used or any other misuse might occur.

The controller 138 can be programmed to give the desired longitudinal motion to the quill in any of its modes; even a pecking motion for deep hole drilling can be used.

While in the above description of the preferred embodiment an electric Servo motor is used to longitudinally move the quill, it is obvious to those skilled in the art that a hydraulic motor, pneumatic motor or the like could be used to achieve the desired result.

The present invention provides a ball screw actuated infinitely variable feed quill drive having all mechanical and electrical components. This quill drive is suitable for reaming, boring, spot facing, chamfering, hollow milling, recessing, drilling, deep hole drilling and tapping. The drive can be used either singly or in multiples on advanced type of machine tools or transfer machines.

The present invention has a unique arrangement of very few parts in a simple assembly providing many advantages of both, versatility of application and maintenance free operation. The above attributes are accomplished without sacrificing any of the advantages of hydraulics such as compactness or ease of adjustments to vary performance and flexibility. There are no clutches or other engagement and disengagement devices. The gears can be replaced by timing belts and shivs or "V" belts for lighter work. No planetary gears or harmonic drive is required. The simplicity of design becomes apparent when it is compared to other mechanical feed units which use two or three motors and/or clutches and brake arrangements to provide rapid feed, machining feed, dwell, and rapid return. In the present invention, the spindle drive has only two moving parts. The rapid advance and feed drive consists of a quill assembly having a ball nut, a ball screw, three gears or a belt and shiv assembly. All functions of the machining cycle are performed by means of a D.C. Servo motor and controller which provides complete control of rate of rapid approach rate of feed, and rate of rapid return. The amount of thrust in feed, amount of thrust in dwell and automatic return when overloaded is also controllable. With the addition of a resolver to the motor, limit switches can be eliminated and the cycle controlled by programmable controller or computer. The spindle motor can be either AC or DC and can be turned off for tool set up. Another embodiment of the present invention converts the quill drive for tapping. When arranged for tapping, only the rear housing and gears or belts are changed and only the reversable DC motor is used for the feed drive and spindle drive which are geared or belted by means of a timing belt to produce the required threads per inch. The thrust capability of the unit (3200 pounds) exceeds self-contained hydraulic units presently available that mount on the same hole pattern. Due to the center thrust design and the bearing construction, the spindle and quill are inherently stable even under high load conditions. The extreme flexibility of the unit is evident by the special cycles which are easily obtained, such as jump gap, dual feed, back feed, dual back feed, forward and back feed, peck feed and any combination of these with single or multiple spindle head applications. A tool change mechanism and single in-line positive stop are standard equipment. Mounting position is not critical, in fact vertical nose up or down, wall mounted or ceiling mounted or any angle in between will not effect its operation. All bearings are grease packed for life and the quill can be lubricated by gravity or automatic system.

An internal maximum out position stop is provided. The stop is easily adjusted through an access hole in the housing. The stop being concentric with the quill provides a precise repeatable stop with great accuracy compared to the conventional external stop which is mounted on the machine frame and is offset from the quill center.

Having thus described my invention, what I claim is:
1. A quill drive with variable feed comprising:
    a quill shaft slidably mounted for movement along its longitudinal axis;
    a spindle shaft rotatably mounted for rotation with respect to said quill shaft and carried longitudinally by said quill shaft during its longitudinal movement;
    a first motor drivably connected to an input shaft, said input shaft rotatably mounted within said spindle shaft;
    said input shaft having disposed along its inner end a male spline;
    said male spline drivingly engaging a female spline disposed at one end of said spindle shaft, said male spline providing rotational drive from said input shaft to the female spline of said shaft during the longitudinal movement of said quill shaft;
    said quill shaft being of tubular construction and having attached thereto a ball nut as its inner end and within its inside diameter;
    a ball screw threadingly engaging said ball nut, said ball screw being of tubular construction, the inside diameter of said ball screw tube surrounding but not touching the outer diameter of the inner end of said quill shaft, said ball screw extending inwardly a distance equal to the desired longitudinal travel of said quill; and said ball screw being rotatably supported at its outer end and driven at its outer end by a variable speed, variable direction motor, the speed and direction of said variable speed and variable direction motor determining the direction and rate of feed of said quill.

2. The quill drive with variable feed as defined in claim 1 wherein said variable speed, variable direction motor is an electrical steper motor.

3. The quill drive with variable feed as defined in claim 1 wherein said variable speed, variable direction motor is a hydraulic motor.

4. The quill drive with variable feed as defined in claim 1 wherein said first motor and said variable speed and variable direction motor are drivingly connected to said input shaft and said ball screw by means of gearing.

5. The quill drive with variable feed as defined in claim 1 wherein said first motor and variable speed and variable direction motor are drivingly connected to said input shaft and said ball screw by means of timing belts.

6. A quill drive with longitudinal feed comprising:
a quill shaft slidably mounted within one end of a housing for movement along its longitudinal axis;
a spindle shaft rotatably mounted for rotation with respect to said quill shaft and carried longitudinally by said quill shaft during its longitudinal movement;
means for longitudinally moving said quill shaft;
means for rotationally driving said spindle shaft;
an adjustable stop for fixedly establishing the maximum longitudinal motion of said quill, said adjustable stop being a ring with a threaded inner diameter, said ring being threadingly attached to the innermost end of said quill, the threaded inner portion of said quill extending along the length of said quill a distance not exceeding the length of said quill's longitudinal motion, said ring abutting the inner wall of said one end of said housing when the maximum motion of said quill is reached;
means for adjusting the position of said ring along the threaded length of said quill and for locking said ring in its desired position; and
means for stopping the extension of said quill shaft when said ring abuts said wall.

7. A tapping quill drive capable of accommodating an infinite variety of thread pitches comprising:

a quill shaft slidably mounted for movement along its horizontal axis;
a spindle shaft rotatably mounted for rotation with respect to said quill shaft during its longitudinal movement;
a spindle shaft rotatably mounted for rotation with respect to said quill shaft and carried longitudinally by said quill shaft during its longitudinal movement;
an input shaft for rotationally driving said spindle shaft during its longitudinal motion;
a drive shaft for longitudinally translating said quill shaft;
means for longitudinally translating said quill shaft a fixed amount per revolution;
means for fixing the rotational ratio between said input shaft and said drive shaft so that for one revolution of said spindle shaft said quill shaft advances a fixed amount;
means for varying said rotational ratio an infinite amount so that any amount of longitudinal motion of said quill per revolution of said spindle shaft is available;
reversible drive means for driving said spindle shaft and said drive shaft; and
an adjustable stop means contained within the quill housing for varying the maximum longitudinal position of said quill.

8. A quill drive with longitudinal feed comprising:
a quill shaft slidably mounted within one end of a housing for movement along its longitudinal axis;
a spindle shaft rotatably mounted for rotation with respect to said quill shaft and carried longitudinally by said quill shaft during its longitudinal movement;
means for longitudinally moving said quill shaft;
means for rotationally driving said spindle shaft;
said means for longitudinally moving said quill shaft comprising a ball nut fixedly attached to the innermost end of said quill;
a ball screw threadingly engaging said ball nut, and means for rotationally driving said ball screw;
an adjustable stop for fixedly establishing the maximum longitudinal motion of said quill, said stop being a ring with a threaded inner diameter, said ring threadingly engaging the innermost end of said ball screw, the threaded portion of said ball screw extending along the length of said ball screw a distance, said ring abutting said ball nut when the maximum motion of said quill is reached.

* * * * *

UNITED STATES PATENT AND TRADEMARK OFFICE
CERTIFICATE OF CORRECTION

PATENT NO. : 4,201,271

DATED : May 6, 1980

INVENTOR(S) : Larry Evans

It is certified that error appears in the above-identified patent and that said Letters Patent are hereby corrected as shown below:

Column 2, line 49, preceding "attached" the correct spelling of "fexedly" should be --fixedly--;

Column 4, line 5, following "shaft" the numeral "24" should be --24'--;

Column 4, line 8, following "shaft" the numeral "24" should be --24'--;

Column 4, line 11, following "shaft" the numeral "24" should be --24'--;

Column 4, line 39, preceding "Fig.3" should read --Fig.2 and--;

Column 4, line 45, preceding "Gears" the numeral "70" should be --71'--;

Column 7, line 13, following "electrical" the correct spelling of "steper" should be --stepper--.

Signed and Sealed this

Twenty-eighth Day of October 1980

[SEAL]

Attest:

SIDNEY A. DIAMOND

Attesting Officer

Commissioner of Patents and Trademarks